Aug. 11, 1959 R. G. CLAPP 2,899,581

COLOR IMAGE-PRODUCING CATHODE RAY TUBE

Filed Jan. 15, 1957 2 Sheets-Sheet 1

INVENTOR.
RICHARD G. CLAPP
BY
[signature]
ATTORNEY

Aug. 11, 1959 R. G. CLAPP 2,899,581

COLOR IMAGE-PRODUCING CATHODE RAY TUBE

Filed Jan. 15, 1957 2 Sheets-Sheet 2

INVENTOR.
RICHARD G. CLAPP
BY
[signature]
ATTORNEY

United States Patent Office 2,899,581
Patented Aug. 11, 1959

2,899,581

COLOR IMAGE-PRODUCING CATHODE RAY TUBE

Richard G. Clapp, Narberth, Pa., assignor to Philco Corporation, Philadelphia, Pa., a corporation of Pennsylvania Application January 15, 1957, Serial No. 634,217

6 Claims. (Cl. 313—92)

This invention relates to color image-producing cathode ray tubes having index elements which serve to generate, in response to electron impingement, an indexing signal indicative of the instantaneous position of the image-producing beam, such signal being utilized to effect proper coordination between modulation and position of the image-producing beam which is essential for proper color rendition.

While the invention is applicable generally to the reproduction of a color image from a color video signal by means of a single cathode ray tube having index elements, the invention is particularly applicable to cathode ray tubes for use in color television receivers.

In a cathode ray tube of the type mentioned, the screen comprises groups of elements which emit light of different primary colors in response to electron impingement, and it also comprises the index elements which are positionally related to the groups of light-emitting elements. Preferably, the colored light-emissive elements are phosphor stripes which preferably extend substantially transversely to the direction of line scanning and are arranged in color triplets, each triplet comprising three phosphor stripes which respond to electron impingement to produce light of three primary colors such as red, green and blue. The index elements preferably are in the form of spaced stripes and they are positionally related to at least some of said triplets. The number of index elements may be equal to, greater or less than the number of groups of colored light-emissive elements.

The cathode ray tube may employ a single electron beam or it may employ a plurality of electron beams. In the case of a single beam, its impingement on the above-mentioned screen elements serves both to produce the color image and to produce the indexing signal. In the preferred form of tube employing two beams, one beam is modulated by the color video signal and is the image-producing beam, while the other beam serves to produce the indexing signal and is the indexing beam. The electron velocity is substantially the same in both beams, and they are deflected by the same deflecting means. Therefore, they are deflected at substantially the same rate and they scan substantially the same raster on the image screen.

The use of two beams is preferred principally in the interest of avoidance of video contamination of the indexing signal. In the same interest, the indexing beam is preferably modulated by a pilot carrier. A color television receiver employing such a dual-beam cathode ray tube is disclosed, for example, in U.S. Patent No. 2,742,531, issued April 17, 1956, to M. E. Partin.

In any case, the electron impingement on the index elements causes a flow of energy from each point of impingement to a common output point from which the indexing signal is derived and is fed to an external circuit. The flow of energy from each point of impingement of the index elements may be secondary electron emission, light emission, conductive flow of electrons, or of any other character. Thus, the index elements may be composed of a material, such as magnesium oxide, to emit secondary electrons to be collected by a collector electrode; or they may be composed of a material, such as zinc oxide, to emit light to be received by photoelectric means; or they may be composed of conductive material and may be connected to a common output lead.

For proper color rendition, the image-producing beam must be modulated by a signal component representative of a particular color at the precise instant when the beam impinges on a particular phosphor element or stripe emissive of light of that color. The indexing signal is utilized to effect this proper coordination between modulation and position of the image-producing beam. This may be termed the indexing function of the signal. It will be realized that the instantaneous phase of the indexing signal is intended to represent and to be indicative of the instantaneous position of the image-producing beam.

In color image-producing systems of the type here involved, it has been found that color error occurs and in any given system the color error follows a particular pattern during each frame scan.

The principal object of the present invention is to eliminate or minimize the color error.

It has been found that color error occurs due to variation in time between the electron impingement on the index elements and the performance of the indexing function by the indexing signal. Due to the time variation, the instantaneous phase of the indexing signal is not always truly representative of the instantaneous position of the image-producing beam and this causes color error. Further, it has been found that the principal cause of the color error is the varying time required for the aforementioned flow of energy from the various points of impingement of the index elements to the common output point where the indexing signal is derived. This time varies from point to point over the screen area due to the fact that the various points of impingement are at different distances from the common output point. For example, in the case of index elements composed of material which is emissive of secondary electrons, the points of impingement are variously spaced from the collector electrode, and the transit time of the secondary electrons varies over the screen area. This causes phase errors in the indexing signal and produces color error in the color image.

In accordance with the present invention, the color error is eliminated or minimized by relatively displacing the index elements and the groups of colored light-emissive elements throughout the screen area according to the predetermined color error pattern. In other words, by this invention the positional relationship of the index elements and the groups of colored light-emissive elements is varied over the screen area according to, and as a function of, the variation in time between electron impingement on the index elements and performance of the indexing function. In this way, the points of impingement of the index elements are effectively shifted, in relation to the associated colored light-emissive elements, so as to compensate for said time variation and to cause the indexing signal always to be truly representative of the instantaneous position of the image-producing beam.

The invention may be fully understood from the following detailed description with reference to the accompanying drawings, wherein—

Figure 1:
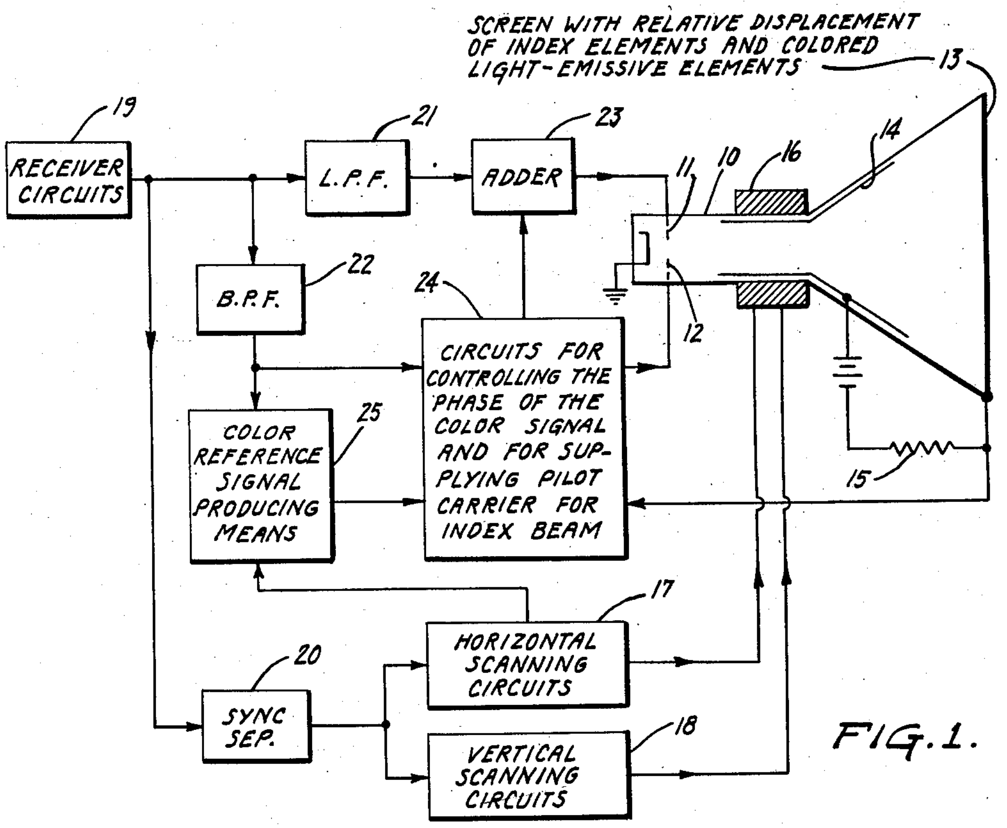
Fig. 1 is a simplified illustration of a typical color television receiver to which the present invention is applied.

Referring first to Fig. 1, the color television receiver illustrated employs a dual-beam cathode ray tube 10 having two control electrodes 11 and 12, a screen 13 having secondary electron-emissive index elements, and a collector electrode 14 which collects the secondary electrons to produce an indexing signal across a load resistor 15. The two beams have the same electron velocity and they are deflected by the same yoke 16 which is supplied with deflection currents from the horizontal and vertical scanning circuits 17 and 18. Therefore the two beams are deflected at substantially the same rate and they scan the same raster on the screen 13. As indicated, the elements of the screen are relatively displaced according to this invention. This will be clearly understood from the subsequent description.

For supplying a color video signal to the control grid 11, there are provided within block 19 the usual receiver circuits which may include the usual radio frequency amplifier, frequency conversion and detector stages for producing a color video signal. In a typical form, the color video signal comprises time-spaced horizontal and vertical synchronizing pulses recurrent at the horizontal and vertical scanning frequencies, and the color video wave occurring in the intervals between the horizontal pulses. As well understood, the color video wave includes successively occurring components representative respectively of different chromatic aspects of elemental areas of an image to be reproduced. The video signal further includes a reference signal for providing a phase reference for the color components of the color video wave, such reference signal usually being in the form of a burst of a small number of cycles of carrier signal having a frequency equal to the frequency of the chromaticity subcarrier component of the video wave and occurring during the so-called backporch interval of the horizontal synchronizing pulses.

The deflection synchronizing pulses contained in the received video signal are selected by a sync signal separator 20 of conventional form, and the separated synchronizing pulses serve to energize, in well known manner, the horizontal and vertical scanning circuits 17 and 18.

In the receiver illustrated, the color video signal is separated into its brightness and chromaticity components by means of a low pass filter 21 and a bandpass filter 22, whereby at the output of filter 21 there is derived the low frequency (e.g., 0–3 mc./sec.) component of the video signal containing the brightness information of the image, and at the output of the filter 22 there is derived a modulated high frequency (e.g., 3.6-mc./sec.) subcarrier component of the video signal containing the chromaticity information of the image and the reference signal.

The brightness signal is supplied to the control electrode 11 of cathode ray tube 10 through an adder 23.

A signal containing the chromaticity information is also supplied to the control electrode 11 through adder 23 from circuits within the block 24. To these circuits are supplied the output of filter 22, a color reference signal from block 25 which includes the usual burst separator and reference oscillator, and the indexing signal from resistor 15. The circuits within the block 24 also supply a pilot carrier to the control grid 12 to vary the intensity of the indexing beam at the pilot carrier frequency as hereinbefore mentioned.

Aside from the fact that the screen 13 of the cathode ray tube 10 is of novel structural character as hereinafter described, the color television receiver simply illustrated in Fig. 1 is representative of prior art receivers wherein an indexing signal is generated in the cathode ray tube and is utilized to effect proper coordination between modulation and position of the image-producing beam, which is essential for proper color rendition. For the present purpose, it suffices to note again that the instantaneous phase of the indexing signal is intended to be indicative of the instantaneous position of the image-producing beam and is instrumental in effecting the coordination between modulation and position of the image-producing beam. Thus, in the type of receiver represented in Fig. 1, the said coordination is effected by controlling the phase of the color-representative signal which is supplied through adder 23 to the control electrode 11, and the instantaneous phase of the indexing signal is instrumental in the performance of the control function.

As previously mentioned, it has been found that color error occurs due to variation in time between the electron impingement on the index elements and the performance of the control function, and it has also been found that the principal cause of the color error is the varying time required for flow of energy from the various points of impingement of the index elements to the common output point. Thus, where the indexing signal is produced by emission of secondary electrons from the index elements, the varying transit time of the secondary electrons from the points of impingement to the collector electrode tends to produce errors in the instantaneous phase of the indexing signal and thus tends to produce color error.

In accordance with this invention the index elements and the groups of colored light-emitting elements are relatively displaced over the screen area according to the predetermined color error pattern or, in other words, as a function of the aforementioned time variation, thereby substantially to prevent the occurrence of the color error. Suppose, for example, that the color-representative signal successively represents the primary colors red, green and blue. Then the previously mentioned color triplets of the image-producing cathode ray tube each may comprise three phosphor stripes emissive of light of the said colors in the order mentioned. The normal position of the indexing stripes may be directly behind the red light-emissive stripes. Then if the space or distance between centers of two consecutive red light-emissive stripes is regarded as 360 electrical degrees, and if the center of a red light-emissive stripe is regarded as positionally representing zero displacement of an associated index stripe, the center of the adjacent green light-emissive stripe positionally represents 120° displacement, and the center of the following blue light-emissive stripe positionally represents 240° displacement. Thus if an index stripe were displaced 120°, it would be shifted from the normal or zero displacement position to a position directly behind the adjacent green light-emissive stripe.

Figure 2:
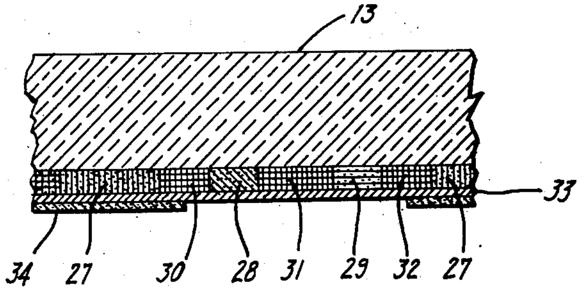
Fig. 2 is a horizontal sectional view of a magnified portion of a preferred form of the image screen.

This may be clearly seen with the aid of Fig. 2 which is a horizontal sectional view of a magnified portion of a preferred form of the screen. The phosphor stripes 27, 28 and 29 of each triplet are applied to the faceplate 13. In this preferred form which has been successfully used experimentally, while the centers of the phosphor stripes of each triplet are equally spaced apart 120°, the red light-emissive stripes 27 are 96° wide and the green and blue light-emissive stripes 28 and 29 are each 48° wide. Between the phosphor stripes are opaque stripes 30, 31 and 32. Stripes 30 and 32 are each 48° wide, while stripe 31 is 72° wide. An aluminum film 33 is applied to the phosphor and opaque stripes, and the index stripes, one of which is shown at 34, are applied to this film. In this structure, an index stripe in the normal or zero displacement position has its center aligned with the center of the red light-emissive stripe. In accordance with one embodiment of this invention, over the visible screen area the index stripes are variously displaced from the normal position according to the pattern of the color error which otherwise would be produced by the aforementioned time variation. In other words, the index stripes are displaced as a function of said time variation to compensate therefor and thus eliminate or minimize the color error. Of course, the same result may be accomplished by displacement of the colored light-emissive elements.

One way of accomplishing the purpose of this invention is to have continuous displacement of the index stripes so as to provide optimum displacement at every point of impingement of the index stripes. However this is difficult and costly, and a satisfactory alternative is to provide zone-by-zone displacement of the index stripes.

Figure 3:
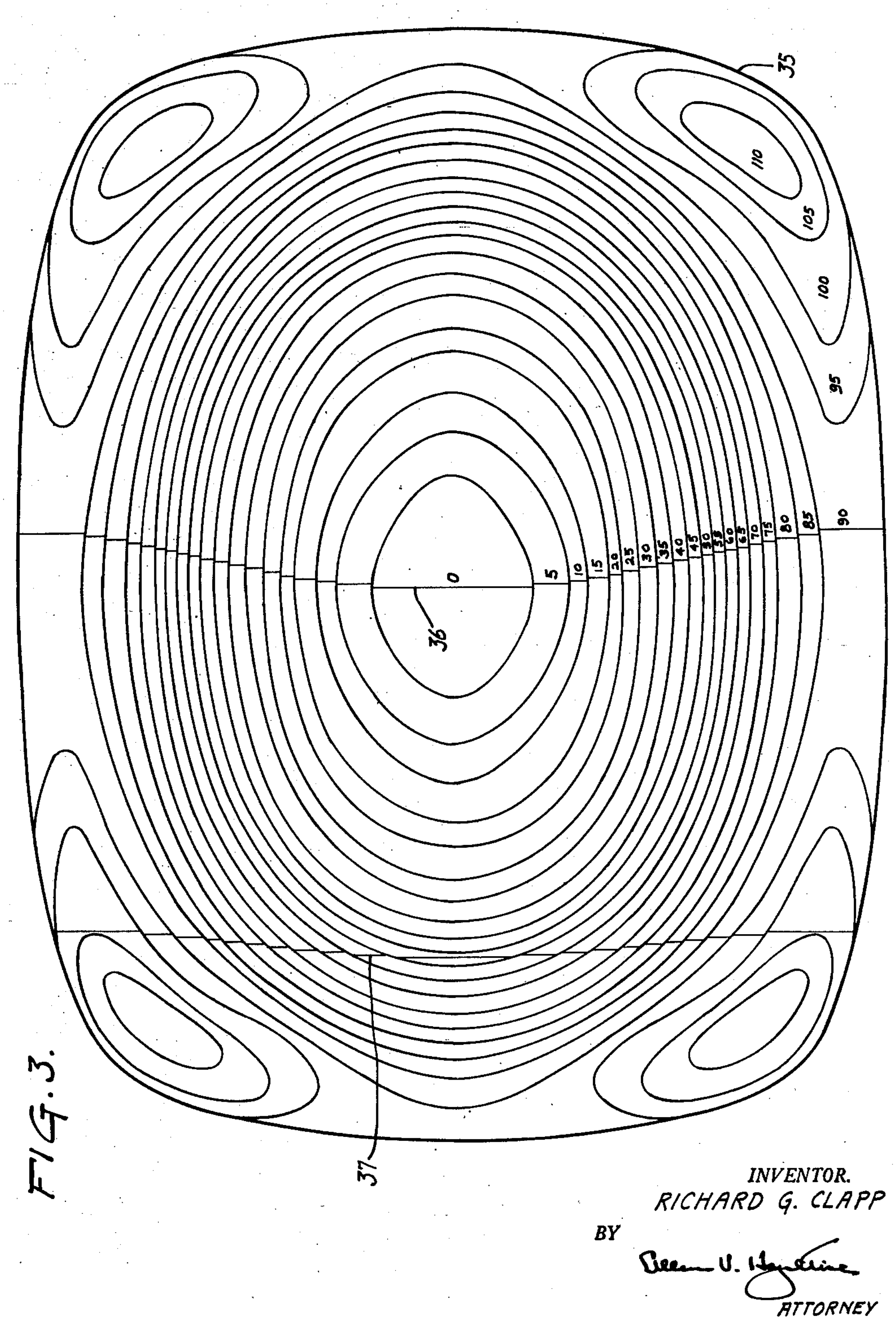
Fig. 3 illustrates, by way of example, one pattern of relative displacement of the screen elements in accordance with this invention.

Referring now to Fig. 3, there is illustrated, by way of example, a pattern of displacement which has been found to be suitable to compensate for varying transit time of the secondary electrons over the screen area in a cathode ray tube such as shown in Fig. 1. In this illustration, the area of the cathode ray tube screen which is visible to a viewer is represented as defined by the border line 35. The screen area is represented as it is seen by a viewer. This area is divided into zones wherein the displacement of the index stripes to the right increases zone-by-zone in 5° increments. Thus within the generally elliptical central zone, the index stripes have zero displacement; within the immediately adjacent surrounding zone, the index stripes have 5° displacement to the right; within the next zone the index stripes have 10° displacement to the right; and so on.

It will be realized that it is impossible to illustrate to scale the actual displacements which are very small. Two of the index stripes are shown at 36 and 37, by way of example, with the displacement greatly exaggerated so as to be clearly visible. Since the index stripe 36 extends through the central zone, it has zero displacement within that zone, but in the other zones through which it extends, it is displaced to the right the number of degrees represented by each zone. Since the index stripe 37 does not extend through the central zone, it is displaced to the right in all of the zones through which it extends, the displacement in each zone being the number of degrees represented by that zone.

It should be noted that this invention may be utilized whether or not the spacing or pitch of the index elements is constant. In a copending application of W. P. Boothroyd, Serial No. 595,751, filed July 3, 1956, there is disclosed and claimed a cathode ray tube wherein the spacing or pitch of the index elements is non-uniform to compensate for non-linearity of horizontal scan. In such a structure, the distance between centers of any two consecutive phosphor stripes emissive of light of the same color may be regarded as 360° as hereinbefore described, although the actual distance may vary from one triplet to another.

While the present invention is not concerned with the method employed to construct the cathode ray tube screen or the manner in which the stripe displacement is effected, it is deemed desirable briefly to discuss these matters.

The preferred method of manufacture of a cathode ray tube of the general type here involved is described in a copending application of M. Sadowsky et al., Serial No. 408,219, filed February 4, 1954. In that method, each set of stripes is formed by first applying to the screen a coating of photosensitive material, then exposing stripe portions of the coating to light, then applying the material which is to form the stripes, and finally washing away the unexposed portions of the coating. In such method, the selective exposure of stripe portions to light is accomplished by projecting light through a mask having transparent stripe portions but being otherwise opaque.

In order to produce the relative displacement according to the present invention, the mask which is used to define the portions of the screen where the displaced stripes are to be applied must be such as to produce the desired displacement of the stripes. In one method disclosed and claimed in a copending application of J. B. Chatten, Serial No. 641,934, filed February 25, 1957, such a mask is produced by successive exposures of a photographic plate through zone plates or masks and an associated striped mask or master. The zone plates or masks are made by first dividing a full-scale map of the screen area of the cathode ray tube into zones, such as shown in Fig. 3, according to the general pattern of color error and the different degrees of displacement necessary to eliminate or minimize the error. Then a zone plate or mask is made for each zone, each such plate or mask being transparent only throughout the area thereof representing the particular zone. The zone plates or masks are successively employed in conjunction with a striped mask or master to effect the desired successive exposures of a photographic plate, the striped master being positioned in each instance according to the displacement desired. Finally, the photographic plate is developed so that it becomes the desired mask.

As previously indicated, this invention contemplates that either the index elements or the colored light-emissive elements may be displaced to eliminate or reduce color error. In the case of displaced index elements, the masks which define the locations of the colored light-emissive elements are formed in the usual way by a single exposure of a photographic plate through a striped master, and the mask which defines the locations of the index elements is formed in the manner above described. In the case of displaced colored light-emissive elements, the masks which define locations of those elements are formed in the manner above described, and the mask which defines the locations of the index elements is formed in the usual way by a single exposure of a photographic plate through a striped master.

While the present invention has been described with reference to certain embodiments thereof and one method of construction, it is to be understood that the invention contemplates such other embodiments as may be found desirable and any suitable method of constructing the same. Thus, while the embodiments described employ screen elements extending substantially transversely to the direction of line scanning, the invention is applicable where the elements extend in the direction of line scanning. For example, with such arrangement of said elements, a wobble motion of the image-producing beam may be employed, and colored light-emissive elements and the index elements may be relatively displaced according to this invention.

I claim:

1. In a color image-producing cathode ray tube having an image screen comprising successive groups of colored light-emissive elements, the elements of each group being emissive of light of different colors in response to electron impingement in the course of each complete scanning of the screen area, and wherein for proper color rendition it is necessary to effect coordination at each instant between modulation and position of the image-producing beam by means of an indexing signal produced by flow of energy from successively scanned points of the screen area to a common output point which necessarily is variously distant from said scanned points, there being consequent variation in time required for flow of energy from the successively scanned points to said output point, tending to introduce phase error in the indexing signal and consequent color error in the reproduced image, means for producing an indexing signal substantially free of such phase error comprising index elements variously positioned in relation to said colored light-emissive elements throughout the screen area as a function of said time variation so that the times of electron impingement of said index elements are such as to compenate for said time variation throughout each complete scanning of the screen area and to render said indexing signal accurately representative of the position of the image-producing beam at each instant.

2. A color image-producing cathode ray tube according to claim 1, wherein said index elements are variously displaced or offset in relation to said colored light-emissive elements throughout the screen area as a function of said time variation.

3. A color image-producing cathode ray tube according to claim 2, wherein said colored light-emissive elements are in the form of stripes, and said index elements are also in the form of stripes extending in the same direction as the light-emissive stripes but are variously displaced or offset in relation thereto.

4. A color image-producing cathode ray tube according to claim 1, wherein said screen comprises the colored light-emissive elements in mutually spaced relation, opaque elements between the light-emissive elements, an electron-permeable film applied to the light-emissive and opaque elements, and the index elements applied to said film.

5. A color image-producing cathode ray tube according to claim 1, wherein said index elements are variously positioned in relation to said colored light-emissive elements in different discrete zones of the screen area.

6. A color image-producing cathode ray tube according to claim 1, wherein said index elements are variously positioned in relation to said colored light-emissive elements in different discrete zones of the screen area including a central zone and successive surrounding zones.

References Cited in the file of this patent

UNITED STATES PATENTS 2,743,312 Bingley ---------------- Apr. 24, 1956